United States Patent [19]
Nissen

[11] Patent Number: 5,931,280
[45] Date of Patent: Aug. 3, 1999

[54] CONVEYOR BELT CLEANING DEVICE

[75] Inventor: Robert E. Nissen, Golden, Colo.

[73] Assignee: Serpentix Conveyor Corp., Westminster, Colo.

[21] Appl. No.: 08/896,975

[22] Filed: Jul. 18, 1997

[51] Int. Cl.[6] .................................................. B65G 45/00
[52] U.S. Cl. .......................................... 198/499; 198/497
[58] Field of Search .................................. 198/499, 497, 198/498, 501

[56] References Cited

U.S. PATENT DOCUMENTS

| | | | |
|---|---|---|---|
| 3,047,133 | 7/1962 | Searles | 198/499 |
| 3,994,384 | 11/1976 | Reiter | 198/497 |
| 4,280,616 | 7/1981 | Wadensten | 198/499 |
| 4,662,507 | 5/1987 | Veenhof | 198/499 |
| 4,795,024 | 1/1989 | Eatwell | 198/499 |
| 4,836,356 | 6/1989 | Mukai et al. | 198/499 |
| 4,860,883 | 8/1989 | Knaul et al. | 198/495 |
| 5,065,859 | 11/1991 | Brumby | 198/499 |
| 5,161,669 | 11/1992 | Gibson et al. | 198/499 |
| 5,725,083 | 3/1998 | Archer | 198/499 |

FOREIGN PATENT DOCUMENTS 1207-928A  1/1986  U.S.S.R. .................. 198/499

OTHER PUBLICATIONS

"New Type Scraper Development Aimed at Removing Sewage Sludge", Continuous Path Conveying, vol. 14 No. 1, pp. 11–12.

"Flex–O–Disc Conveyor Belt Scraper", ASGCO Mfg, Allentown Pennsylvania, Brochure.

*Primary Examiner*—Kenneth Noland
*Assistant Examiner*—Khoi H. Tran
*Attorney, Agent, or Firm*—Kyle W. Rost

[57] ABSTRACT

A conveyor belt cleaning device provides a belt scraper blade and a roller juxtaposed to the blade on its downstream side, relative to the direction of conveyor belt travel. Frictional contact between the moving conveyor belt and roller drives the roller. The scraper blade scrapes stringy materials from the belt and the roller pinches trailing stringy materials between the belt and the roller, pulling such materials from the blade.

4 Claims, 3 Drawing Sheets

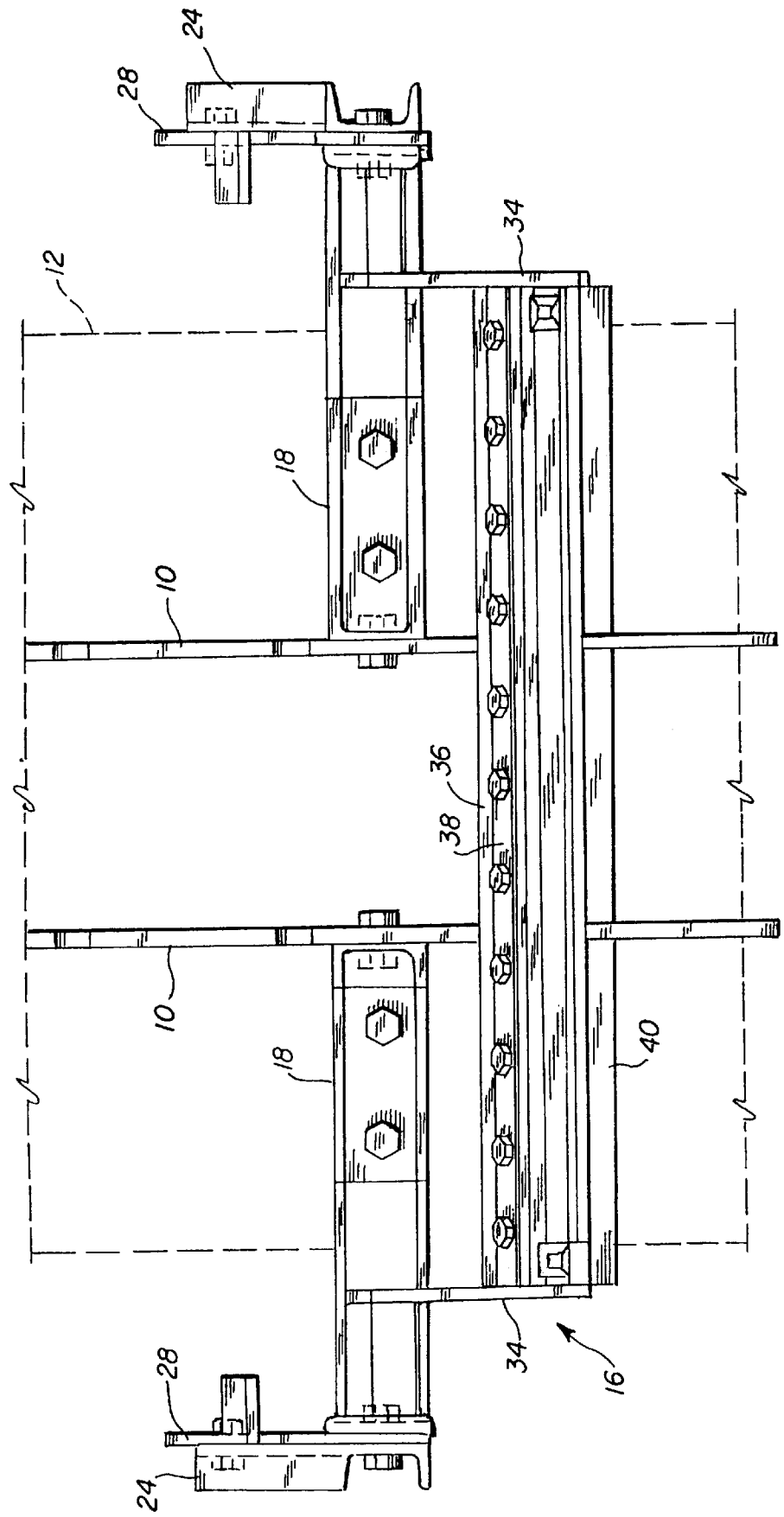

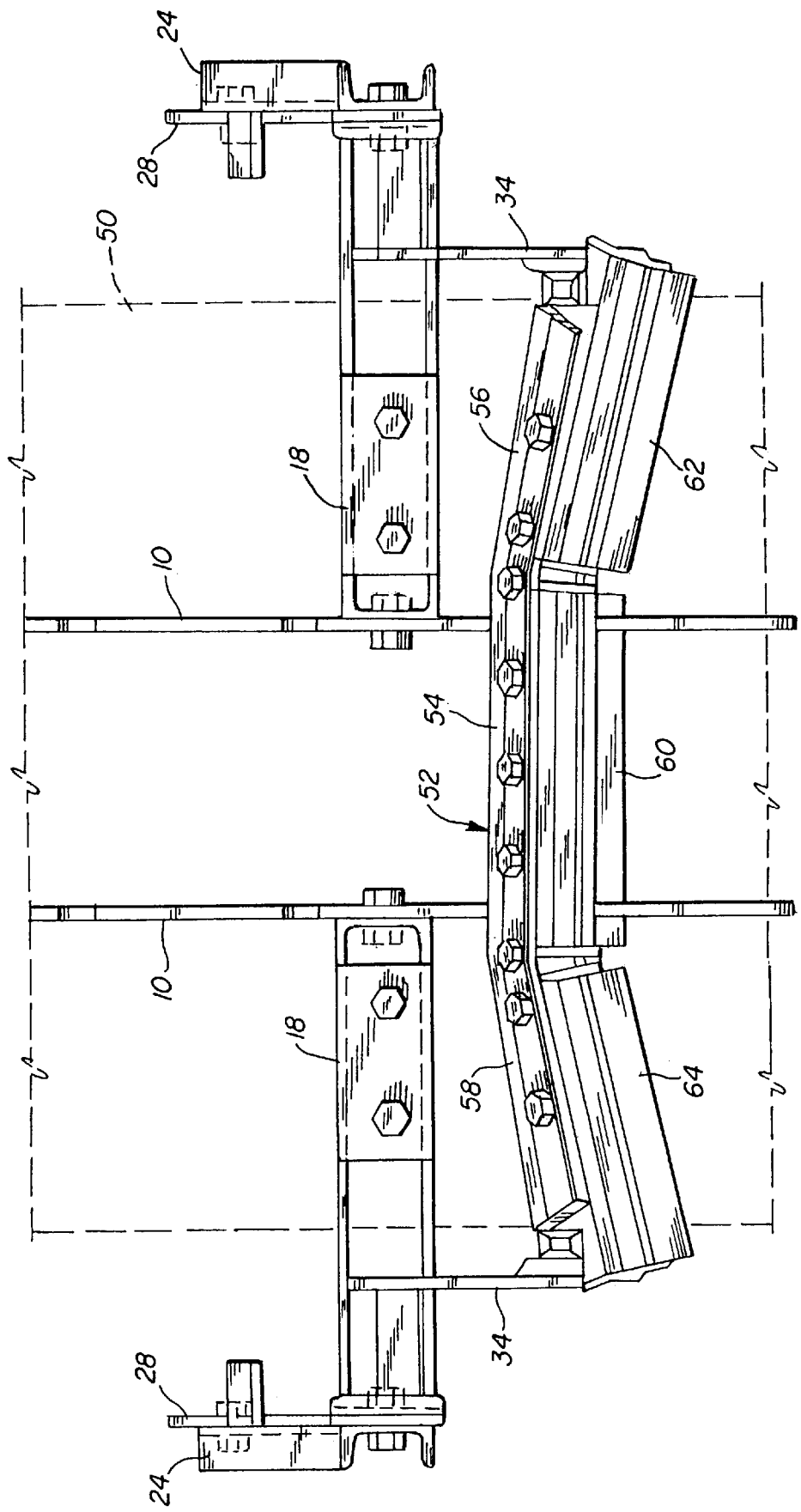

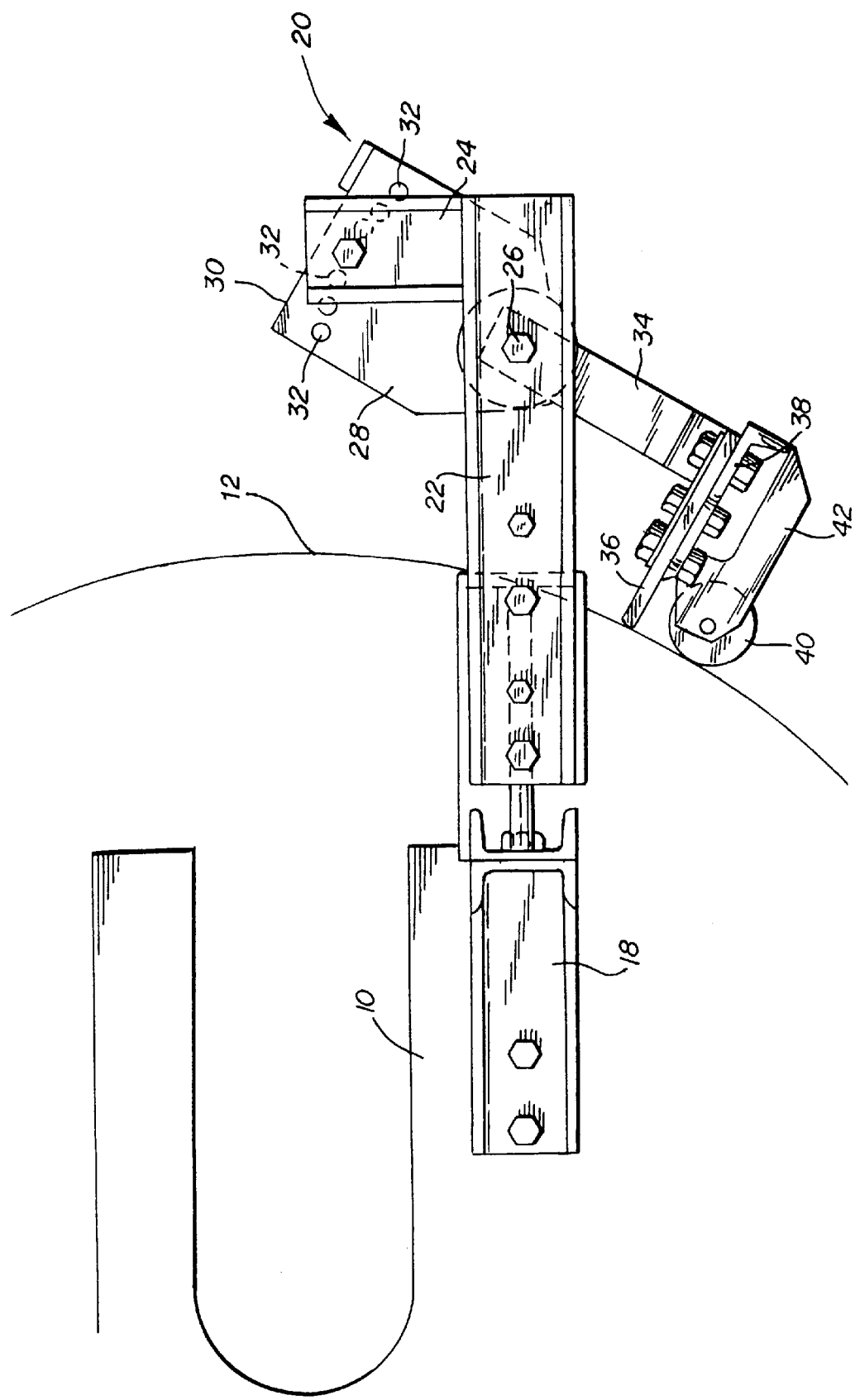

CONVEYOR BELT CLEANING DEVICE

TECHNICAL FIELD

The invention generally relates to power driven conveyors having a means to facilitate cleaning of the conveyor belt. More specifically, the invention relates to a cleaning means by a conveyor contacting scraper. The invention discloses a belt cleaning device in which a blade is applied to a conveyor belt in series with a juxtaposed downstream roller, wherein both are biased against the conveyor belt and are an effective combination for removing stringy cargo materials from the belt surface.

BACKGROUND ART

Belt conveyors carry cargo materials that may adhere to the endless belt and must be removed during each revolution of the belt in order to maintain efficient operation. Removal is accomplished by applying a cleaner device to the belt, typically either at the discharge end or along the bottom run. Among the known types of cleaners are scrapers and washers, or combinations of these. Depending upon the characteristics of the cargo, known scrapers and washers may perform satisfactorily. However, certain cargos are exceedingly difficult to remove. For example, sludge and similar gelatinous materials can build on a scraper blade until the sludge lifts the blade from the belt, and the blade loses effective operation. In still more difficult circumstances, the sludge may contain long, stringy materials that tend to wrap around a scraper blade and lift it from the belt surface. Such stringy materials not only cause a blade to become ineffective, but because they have wrapped themselves around the blade, their removal may require the attention of a mechanic.

Stringy sludges and similar types of cargo that are difficult to clean from a conveyor belt often are transported on a particular type of conveyor belt that having a physical configuration of convolutions and troughs. Conveyor belts of this type are known as Serpentix belts, because for many years they have been supplied on patented conveyor systems sold under the trademark, Serpentix. In particular, many sludge processing plants find that a troughed, convoluted belt is the most effective choice for moving sludge because a single conveyor can transport the sludge over whatever route is required, despite bends and curves, without a transfer to another belt conveyor. Belts of the Serpentix type are highly desirable in other industrial settings, as well, wherever a load must be carried through a horizontal corner or serpentine pathway. The advantage of using only one conveyor instead of multiple conveyors can be substantial. When transporting an adherent cargo such as sludge, any transfers would be undesirable and could compound the inherent problems with the cargo. Another advantage is that a convoluted, troughed belt can carry a larger load than an equivalent flat belt and is more effective than a flat belt in retaining its load. The convolutions and troughs additionally are helpful in retaining the load against back flow, loss or spillage through vertical or horizontal curves.

Two examples in patent art show belt cleaners that use compound systems in order to extend the effectiveness of belt cleaning operations. U.S. Pat. No. 4,795,024 to Eatwell discloses a conveyor belt scraper unit that has two pairs of arms, one pair operating on each side of a conveyor belt. A first pair carries a scraper blade that is applied to a face of a flat belt, while the second pair carries a reaction roller that acts against the back side of the flat belt in opposition to the scraper blade. A spring acts between the blade and roller to urge together the two components. This unit resists separation between the blade and belt, although a sufficiently difficult, stringy, sludge-like cargo still will overcome the spring force as the stringy elements wrap the blade.

U.S. Pat. No. 4,860,883 to Knaul et al. discloses a conveyor belt cleaning apparatus in which both a powered cleaning roller and a scraper blade engage the bottom of a conveyor belt. Nozzles spray fluid on the cleaning roller to supply cleaning fluid for application to the belt. A pressure roller squeezes excess fluid from the cleaning roller, while a scraper blade, located downstream from the cleaning roller, removes residual fluid and dirt from the belt. This apparatus is effective in situations where the cleaning roller is capable of substantially cleaning the belt. However, sludges can be far too thick and difficult to be handled by such a cleaning roller, which would all too soon become coated with sludge coating that would clog the operation of the entire apparatus.

Thus, there is a substantial need for a conveyor belt cleaning device that can remove adherent stringy materials from a conveyor belt and remain effective despite the tendency of such stringy materials to build up and wrap around the cleaning device.

To achieve the foregoing and other objects and in accordance with the purpose of the present invention, as embodied and broadly described herein, the apparatus and method of this invention may comprise the following.

DISCLOSURE OF INVENTION

Against the described background, it is therefore a general object of the invention to provide an improved cleaning device for endless conveyor belts.

A more specific object is to provide a cleaning device that employs a rigid blade for scraping a conveyor belt, and provides an associated means for removing stringy materials from the rigid blade.

Another object is to provide a self-cleaning scraper for use on belt conveyors, in which the self-cleaning device is effective to automatically remove stringy materials.

Still another object is to provide a belt cleaning device that effectively cleans stringy materials from conveyor belts of substantially any configuration.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

According to the invention, a conveyor belt cleaning device includes a belt scraper blade and a means for supporting the blade in scraping contact with a conveyor belt that moves in a preselected direction of travel. At least one roller is juxtaposed to the blade on its downstream side, relative to the preselected direction of conveyor belt travel. A suitable support carries the roller in rolling contact with the same conveyor belt as the blade.

Another aspect of the invention is a method of cleaning stringy cargo materials from a conveyor belt that moves in a preselected direction of travel. First, a scraper blade is positioned against the conveyor belt in a position substantially transverse to the direction of belt movement. Also, a roller is positioned against the conveyor belt and juxtaposed to said scraper blade on the downstream side thereof relative to the preselected direction of travel. Then, the conveyor belt is moved in the preselected direction of travel. Frictional contact between the moving conveyor belt and roller drives the roller. The scraper blade scrapes stringy materials from the belt by engaging them, and the stringy materials trailing the blade are pinched between the belt and the roller. Continued operation of the conveyor belt drives the roller and pulls the pinched stringy materials free of the scraper blade.

The accompanying drawings, which are incorporated in and form a part of the specification illustrate preferred embodiments of the present invention, and together with the description, serve to explain the principles of the invention. In the drawings:

BRIEF DESCRIPTION OF THE DRAWINGS

FIG. 1 is a top view of a conveyor belt cleaning device applied to a flat belt, showing the conveyor belt in phantom.

FIG. 2 is a view similar to FIG. 1, but showing the conveyor belt cleaning device applied to a troughed belt, showing the conveyor belt in phantom.

FIG. 3 is a side elevational view of FIGS. 1 or 2, showing the interface of the conveyor belt and the cleaning device, with the troughed belt edges of FIG. 2 omitted for clarity.

BEST MODE FOR CARRYING OUT THE INVENTION

The invention is a conveyor belt cleaning device that effectively removes long, stringy cargo materials from the belt. Long, stringy materials may be found in certain sludges, which adhere to the belt and to typical belt scrapers. An example is material collected from the influent channel of a waste water treatment plant by a bar screen or mechanical rake. Such materials can become wrapped around the scraper blade and separate the edge of the blade from working contact with the belt. The invention solves this problem by providing a roller juxtaposed to the scraper blade and contacting the belt. The roller pinches the long, stringy materials between itself and the belt. The cooperative action of the roller and belt then pulls the stringy materials free of the scraper blade, restoring effective scraping action.

The cleaning device can be used with flat belts or troughed belts. FIG. 1 shows a generalized installation on a flat belt conveyor, and FIG. 3 shows additional details applicable to either a flat belt or troughed belt unit. A conveyor frame 10 runs the length of the conveyor and supports the endless belt 12, shown in phantom. A suitable supporting structure, such a series of rollers, not shown, may be carried on the frame 10 and directly carry the belt. The details of conveyor structure are not critical to this invention and are omitted for clarity in the drawings. The cleaning device 16 is mounted to or carried on the conveyor frame 10. A suitable mounting may be by a pair of support brackets 18, which extend from the frame 10 to a position beyond the opposite side edges of the belt 12. Each of the brackets 18 may be L-shaped, with one leg bolted to the frame 10, while the other leg extends transversely outwardly from the side of the belt.

At its outer end, support bracket 18 may carry a scraper tensioning unit 20, which is well known in the art. A typical tensioning unit is mounted to brackets 18 on length-adjustable arms 22 that permit tension adjustment by changing the spacing of the scraper from the belt. The outer end of arm 22 carries a cross arm 24 and also carries a first connection or pivot bolt 26 engaging a near end of a positioning block 28. The opposite end 30 of the positioning block is provided with a series of position selecting holes 32, a selected one of which is used to fix or fasten the position of the block to the cross arm 24. The scraper is fixedly connected to the positioning block 28 by support arm 34, which supports the belt scraper blade 36 between sandwich plates 38. The blade is positioned and tensioned against the belt by suitable selection of a position mounting hole 32 and adjustment of the effective length of the arm 22.

A roller 40 is carried from support arm 34 between end plates 42 in a position juxtaposed to the belt scraper blade. It is preferred that the blade and roller share a common mounting structure from the arms 34 and that the distance between them is fixed. Thus, the end plates 42 support the roller from the downstream plate 38 carrying the blade. The blade defines a working edge that contacts the surface of the belt during use. The roller defines a belt contact line at the interface of the roller and belt during use. The relative positioning of the blade and roller should be such that the working edge and belt contact line lie in a common plane so that both will contact the belt as fully as possible when properly positioned and tensioned. The roller is separated from the blade by a clearance to allow rotation unhindered by the blade. Closeness between the roller and blade is desired so that the roller will pinch long stringy materials that engage the blade. A suitable separation is less than one-half inch, or about three-eighths inch. In addition, the roller is sized to position the belt contact line close to the blade, a typical separation being about one inch. The roller, itself, is about one inch in diameter. The conveyor belt serves as the drive means for the roller. In order to obtain friction drive between the belt and roller, the roller surface should have a bushing type friction surface.

A troughed and convoluted belt can be cleaned by the blade and roller pair in much the same way. FIG. 2 shows a modification of the cleaning device that adapts it for use with a troughed belt 50, shown in phantom. A troughed belt has a flat center and upwardly angled sides. The contour of the scraper blade 52 provides a good indication of how the belt is configured. The blade has a straight center portion 54 and on its right and left sides as viewed in FIG. 3, the blade has acutely upwardly angled portions 56, 58. Each blade portion engages its working edge against a surface of the belt. The roller in FIG. 2 is composed of three separate rollers. Center roller 60 is associated with center blade portion 54; right roller 62 is associated with right blade portion 56; and left roller 64 is associated with left blade portion 58. The three rollers are supported from end plates 42 attached to the downstream plate 38 carrying the blade. The remaining structures of FIG. 2 are similar to those of FIG. 1 and corresponding parts numbered identically.

In operation, the blade and roller are supported by suitable means with the blade in scraping contact with a conveyor belt, which typically is moveable in a preselected direction of travel during cargo carrying operation. As noted above, the mounting for the blade and roller many be of any suitable design to support the components against the belt, and a belt tensioner typically will be used. At least one roller is juxtaposed to the blade on its downstream side, relative to the preselected direction of conveyor belt travel. Another suitable means supports the roller in rolling contact with the conveyor belt. The roller is preferred to share its support with the blade, so that the roller can pull against the common support when pulling stringy materials from the blade.

The operation of the blade is standard scraping action against the belt surface. The working edge of the blade should be designed to conform to the transverse contour of the belt. Thus, for a flat belt, the scraper blade defines a working edge substantially following a straight line and at least as wide as the belt. Similarly, the belt contact line of the roller should conform to the contour of the belt. Thus, for use with a flat belt, the roller defines a substantially straight belt contact line.

When the cleaning device is used with a troughed conveyor belt, the scraper blade and rollers are adapted to the transverse contour of the trough. In that case, typically the scraper blade defines a working edge having at least three acutely angled segments, including a straight center portion and an upwardly sloped side portion at each opposite end of the straight center portion. The single roller used with a flat belt is replaced with at least three rollers. At least one of the rollers is juxtaposed to and aligned with each edge segment of the at least three working edge segments of the blade. Then, each roller is well positioned to clean stringy materials from the blade segment aligned with it.

Thus, the cleaning device operates in a unique method to clean stringy cargo materials from a conveyor belt moving in a preselected direction of travel. According to such method, a scraper blade is positioned against the conveyor belt and substantially transverse to the direction of belt movement. A roller positioned against the conveyor belt and juxtaposed to the scraper blade on the downstream side thereof relative to the preselected direction of travel. In use, the conveyor belt moves in the preselected direction of travel with its carried cargo of stringy materials. The belt drives the roller by frictional contact with the moving belt. The scraper blade engages the stringy materials on the belt, and some of these materials tend to be retained on the blade. Such strings tend to trail the downstream face of the blade due to the direction of belt movement and the action of gravity, if the scraper is on an end portion of the conveyor. The roller pinches the trailing stringy materials between the itself and the belt. The continued operation of the conveyor continues to drive the roller and pulls the pinched stringy materials free of the scraper blade.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

I claim:

1. A conveyor belt cleaning device for use with a troughed conveyor belt, comprising:

a belt scraper blade that defines a working edge having at least three acutely angled working edge segments, including a straight center portion and an upwardly sloped side portion at each opposite end of the straight center portion;

means for supporting said blade in scraping contact with a conveyor belt moveable in a preselected direction of travel;

at least three rollers juxtaposed to said blade on its downstream side, relative to the preselected direction of conveyor belt travel, with at least one of said three rollers juxtaposed to each of said at least three working edge segments of the blade; and means for supporting said rollers in rolling contact with the same conveyor belt as the blade.

2. The conveyor belt cleaning device of claim 1, wherein:

said means for supporting the blade comprises a tensioning device; and said means for supporting the roller is connected to the means for supporting the blade.

3. The conveyor belt cleaning device of claim 2, wherein said tensioning device carries said blade and said rollers on a common arm.

4. The method of cleaning stringy cargo materials from a troughed conveyor belt moving in a preselected direction of travel, comprising:

providing a scraper blade positioned against the conveyor belt and substantially transverse to the direction of belt movement, wherein said blade defines a working edge having at least three acutely angled working edge segments, including a straight center portion and an upwardly sloped side portion at each opposite end of the straight center portion;

providing at least three rollers positioned against the conveyor belt and juxtaposed to said scraper blade on the downstream side thereof relative to the preselected direction of travel, with at least one of said three rollers juxtaposed to each of said at least three working edge segments of the blade;

moving the conveyor belt in the preselected direction of travel;

driving the provided rollers by frictional contact with the moving conveyor belt;

scraping stringy materials from the belt by engaging them with the provided scraper blade;

pinching stringy materials engaged by the scraper blade between the belt and the rollers; and pulling the pinched stringy materials free of the scraper blade by continued driving of the rollers.

* * * * *